(12) United States Patent
Kim

(10) Patent No.: US 12,095,117 B2
(45) Date of Patent: Sep. 17, 2024

(54) INSULATOR FOR SECONDARY BATTERY AND SECONDARY BATTERY INCLUDING THE SAME

(71) Applicant: LG ENERGY SOLUTION, LTD., Seoul (KR)

(72) Inventor: Sue Jin Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 514 days.

(21) Appl. No.: 17/429,936

(22) PCT Filed: Mar. 20, 2020

(86) PCT No.: PCT/KR2020/003872
§ 371 (c)(1),
(2) Date: Aug. 10, 2021

(87) PCT Pub. No.: WO2020/190092
PCT Pub. Date: Sep. 24, 2020

(65) Prior Publication Data
US 2022/0216572 A1  Jul. 7, 2022

(30) Foreign Application Priority Data
Mar. 20, 2019 (KR) .................. 10-2019-0031578

(51) Int. Cl.
*H01M 50/00* (2021.01)
*H01M 10/04* (2006.01)
(Continued)

(52) U.S. Cl.
CPC ..... *H01M 50/477* (2021.01); *H01M 10/0422* (2013.01); *H01M 50/474* (2021.01);
(Continued)

(58) Field of Classification Search
CPC ........... H01M 50/477; H01M 10/0422; H01M 50/474; H01M 50/486; H01M 50/586;
(Continued)

(56) References Cited

U.S. PATENT DOCUMENTS

| 5,641,591 A | 6/1997 | Kawakami et al. |
| 2009/0117459 A1 | 5/2009 | Hyung et al. |

(Continued)

FOREIGN PATENT DOCUMENTS

| CA | 2154212 A1 | 1/1996 |
| CN | 101431164 A | 5/2009 |

(Continued)

OTHER PUBLICATIONS

English translation JP2014010939A (Year: 2014).*

(Continued)

*Primary Examiner* — Cynthia H Kelly
*Assistant Examiner* — Monique M Wills
(74) *Attorney, Agent, or Firm* — MORGAN, LEWIS & BOCKIUS LLP

(57) ABSTRACT

An insulator for a secondary battery and a secondary battery including the insulator are disclosed. According to one aspect, an insulator for a secondary battery includes: a body part configured to define a body; and a buffer part adhering to a top surface of the body part, wherein the buffer part includes a plurality of protrusions that protrude upward, and the body part is made of a material different from that of the buffer part.

9 Claims, 8 Drawing Sheets

(51) Int. Cl.
  *H01M 50/474* (2021.01)
  *H01M 50/477* (2021.01)
  *H01M 50/486* (2021.01)
  *H01M 50/586* (2021.01)
  *H01M 50/593* (2021.01)
  *H01M 50/176* (2021.01)
  *H01M 50/179* (2021.01)

(52) U.S. Cl.
  CPC ....... *H01M 50/486* (2021.01); *H01M 50/586* (2021.01); *H01M 50/593* (2021.01); *H01M 50/176* (2021.01); *H01M 50/179* (2021.01)

(58) Field of Classification Search
  CPC ............. H01M 50/593; H01M 50/176; H01M 50/179; H01M 10/04; H01M 50/107; H01M 50/14; H01M 50/198; H01M 50/186; H01M 50/191; H01M 50/193; H01M 50/197; H01M 50/184; H01M 50/572; Y02E 60/10; Y02P 70/50
  See application file for complete search history.

(56) References Cited

U.S. PATENT DOCUMENTS

| | | |
|---|---|---|
| 2010/0068616 A1 | 3/2010 | Eo et al. |
| 2010/0216013 A1 | 8/2010 | Kim |
| 2010/0247991 A1 | 9/2010 | Hosokawa et al. |
| 2011/0129708 A1* | 6/2011 | Doo .................. H01M 50/107 429/94 |
| 2013/0252055 A1 | 9/2013 | Kim et al. |
| 2014/0186670 A1* | 7/2014 | Kim .................. H01M 50/107 429/82 |
| 2018/0062120 A1 | 3/2018 | Kim et al. |
| 2018/0269435 A1 | 9/2018 | Lee et al. |
| 2019/0044121 A1 | 2/2019 | Kawate |

FOREIGN PATENT DOCUMENTS

| | | |
|---|---|---|
| CN | 101677132 A | 3/2010 |
| CN | 207602713 U | 7/2018 |
| CN | 208127280 U | 11/2018 |
| JP | H10-284046 A | 10/1998 |
| JP | 4055219 B2 | 3/2008 |
| JP | 2010-073688 A | 4/2010 |
| JP | 5279448 B2 | 9/2013 |
| JP | 2014010939 A * | 1/2014 |
| JP | 2014-72050 A | 4/2014 |
| KR | 20000006173 U | 4/2000 |
| KR | 20-0207949 Y1 | 11/2001 |
| KR | 10-2009-0105497 A | 10/2009 |
| KR | 10-2010-0081342 A | 7/2010 |
| KR | 10-2010-0097592 A | 9/2010 |
| KR | 10-2011-0060484 A | 6/2011 |
| KR | 10-2012-0066916 A | 6/2012 |
| KR | 10-2013-0004074 A | 1/2013 |
| KR | 10-2013-0043434 A | 4/2013 |
| KR | 10-2016-0015898 A | 2/2016 |
| KR | 10-2018-0024162 A | 3/2018 |
| KR | 10-2018-0120100 A | 11/2018 |
| WO | 2017188605 A1 | 11/2017 |

OTHER PUBLICATIONS

Extended European Search Report issued in corresponding European Patent Application No. 20773604.2, dated Feb. 10, 2022. Note JP 4055219-B cited therein is already of record.

International Search Report issued in corresponding International Patent Application No. PCT/KR2020/003872, dated Mar. 20, 2020.

Office Action issued in corresponding Japanese Patent Application No. 2021-547783, dated Sep. 6, 2022.

Yin et al., Real Estate Terminology, May 2013, China University of Mining and Technology Press, China.

Xia, Construction and Repair of Electric Loading and Unloading Machinery, Dec. 2003, Dalian Maritime University Press, China.

Decision of Rejection issued on Sep. 27, 2023 for the corresponding Chinese patent application 202080012801.3.

Office Action issued in corresponding Chinese Patent Application No. 202080012801.3, dated Nov. 28, 2022.

* cited by examiner

INSULATOR FOR SECONDARY BATTERY AND SECONDARY BATTERY INCLUDING THE SAME

CROSS-REFERENCE TO RELATED APPLICATION

The present application claims the benefit of the priority of Korean Patent Application 10-2019-0031578, filed on Mar. 20, 2019, which is hereby incorporated by reference in its entirety.

TECHNICAL FIELD

The present invention relates to an insulator for a secondary battery and a secondary battery including the same, and more particularly, to an insulator for a secondary battery, which minimizes an impact applied to an electrode assembly when compared to the related art and a secondary battery including the insulator.

BACKGROUND ART

Secondary batteries that are repetitively chargeable and dischargeable may be divided into pouch type secondary batteries, cylindrical type secondary batteries, and prismatic type secondary batteries according to their structures.

An electrode assembly having a structure in which electrodes and separators are alternately disposed is provided in a secondary battery, and an insulator may be provided on an upper or lower portion of the electrode assembly.

The insulator serves to electrically insulate the electrode assembly from other components. According to the related art, there is a problem that an impact is applied to the electrode assembly due to collision between the insulator and the electrode assembly and collision between the electrode assembly and other components that are adjacent to the electrode assembly while the secondary battery is used. In particular, when vibration is applied to the secondary battery from the outside, there is a problem that the secondary battery is deteriorated in durability due to an impact that is continuously applied to the electrode assembly. For example, when the impact or the vibration is applied to the electrode assembly, there is a problem that an electrode tab of the electrode assembly is separated from its original position to cause an abnormal operation of the secondary battery.

DISCLOSURE OF THE INVENTION

Technical Problem

Therefore, an object to be achieved by the present invention is to improve durability of a secondary battery by minimizing an impact applied to the electrode assembly due to an external impact or vibration.

Technical Solution

According to one aspect of the present invention for achieving the above object, an insulator for a secondary battery includes: a body part configured to define a body; and a buffer part adhering to a top surface of the body part, wherein the buffer part includes a plurality of protrusions that protrude upward, and the body part is made of a material different from that of the buffer part.

The buffer part may be made of a material having elasticity.

The buffer part may include polybutylene terephthalate, polypropylene, perfluoroalkoxy, or a rubber material.

A horizontal cross-section of each of the plurality of protrusions may have an elongated rod shape.

A horizontal cross-section of each of the plurality of protrusions may have a circular or oval shape.

Since the plurality of protrusions are connected to each other by a lower region of the buffer part, the plurality of protrusions may be integrally provided.

Since a top surface of the body part is exposed to the outside between the plurality of protrusions, the plurality of protrusions may be provided separately from each other.

An upper area of a surface of each of the plurality of protrusions may have a curved shape.

The plurality of protrusions may include: first protrusions in which the rod shape in the horizontal cross-section extends in a first direction (D1); and second protrusions in which the rod shape in the horizontal cross-section extends in a second direction (D2).

The first direction (D1) and the second direction (D2) may be perpendicular to each other.

According to another aspect of the prevent invention for achieving the above object, a secondary battery includes: a battery can having a structure in which an upper portion is opened; a top cap coupled to the upper portion of the battery can; an electrode assembly accommodated in the battery can; and the insulator for the secondary battery, which is provided to face a top or bottom surface of the electrode assembly.

The insulator may include: an upper insulator facing the top surface of the electrode assembly; and a lower insulator facing the bottom surface of the electrode assembly, wherein each of the plurality of protrusions of the upper insulator and the plurality of protrusions of the lower insulator may be provided to face the electrode assembly.

Advantageous Effects

According to the present invention, the impact applied to the electrode assembly due to the external impact or vibration may be minimized to improve the durability of the secondary battery.

MODE FOR CARRYING OUT THE INVENTION

Hereinafter, structures of a secondary battery and an insulator for the secondary battery according to the present invention will be described with reference to the accompanying drawings. The secondary battery according to the present invention may be applied to a cylindrical type secondary battery or a prismatic type secondary battery.
Secondary Battery and Insulator for Secondary Battery FIG. 1 is a side cross-sectional view illustrating a structure of a secondary battery according to the present invention.

Figure 1:
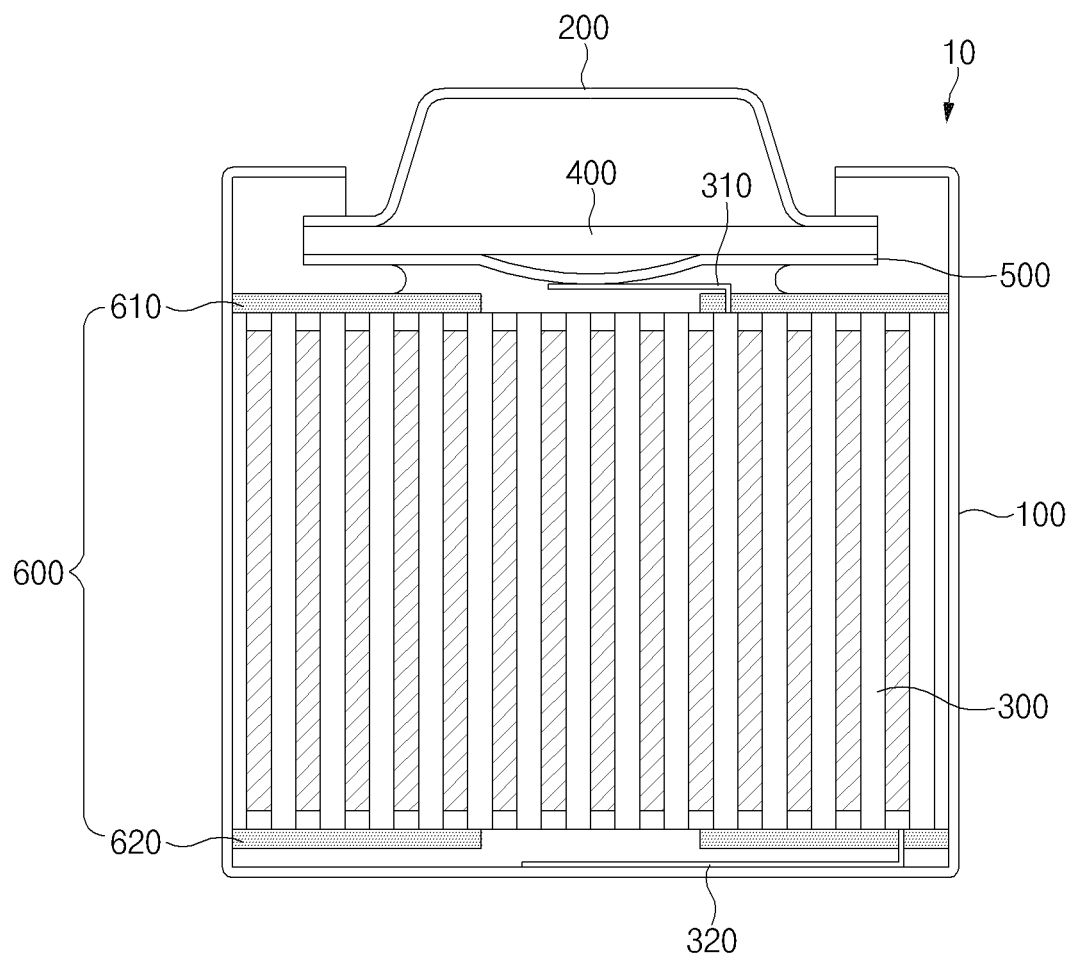
FIG. 1 is a side cross-sectional view illustrating a structure of a secondary battery according to the present invention.

As illustrated in FIG. 1, a secondary battery 10 according to the present invention may include a battery can 100 having a structure, in which an upper portion is opened, and a top cap 200 coupled to the upper portion of the battery can 100.

An electrode assembly 300 may be accommodated in the battery can 100. The electrode assembly 300 may have a structure in which electrodes and separators are alternately disposed.

Electrode tabs 310 and 320, each of which has a shape protruding outward may be disposed on the electrode assembly 300. FIG. 1 illustrates a case in which a protruding first electrode tab 310 is disposed on an upper portion of the electrode assembly 300, and a protruding second electrode tab 320 is disposed on a lower portion of the electrode assembly 300.

Continuously, referring to FIG. 1, a current interrupt member 400 may be provided below the top cap 200, and a safety vent 500 may be provided below the current interrupt member 400. As illustrated in FIG. 1, a peripheral portion of a top surface of the current interrupt member 400 may be provided in close contact with a peripheral portion of a bottom surface of the top cap 200, and a peripheral portion of a top surface of the safety vent 500 may be provided in close contact with a peripheral portion of a bottom surface of the current interrupt member 400. The current interrupt member may be, for example, a PTC element. The safety vent 500 may be electrically connected to the first electrode tab 310.

The secondary battery 10 according to the present invention may include an insulator 600 for the secondary battery (hereinafter, referred to as an 'insulator') provided to face the top or bottom surface of the electrode assembly 300. Hereinafter, in this specification, the insulator facing the top surface of the electrode assembly 300 is referred to as an upper insulator 610, and the insulator facing the bottom surface of the electrode assembly 300 is referred to as a lower insulator 620. FIG. 1 illustrates a case in which both the upper insulator 610 and the lower insulator 620 are provided. However, alternatively, the secondary battery 10 according to the present invention may be provided with only the upper insulator 610 or the lower insulator 620. Also, the upper insulator 610 or the lower insulator 620 may be in close contact with the top or bottom surface of the electrode assembly 300, respectively. Alternatively, the upper insulator 610 or the lower insulator 620 may be spaced a predetermined distance from the electrode assembly 300. As described later, a plurality of protrusions 604a (see FIGS. 2 to 8) may be disposed on the insulator 600. When the upper insulator 610 is provided in the secondary battery 10 according to the present invention, the upper insulator 610 may be provided so that the plurality of protrusions of the upper insulator 610 face the electrode assembly 300. When the lower insulator 620 is provided in the secondary battery 10 according to the present invention, the lower insulator may be provided so that the plurality of protrusions 620 of the lower insulator faces the electrode assembly 300.

Figure 2:
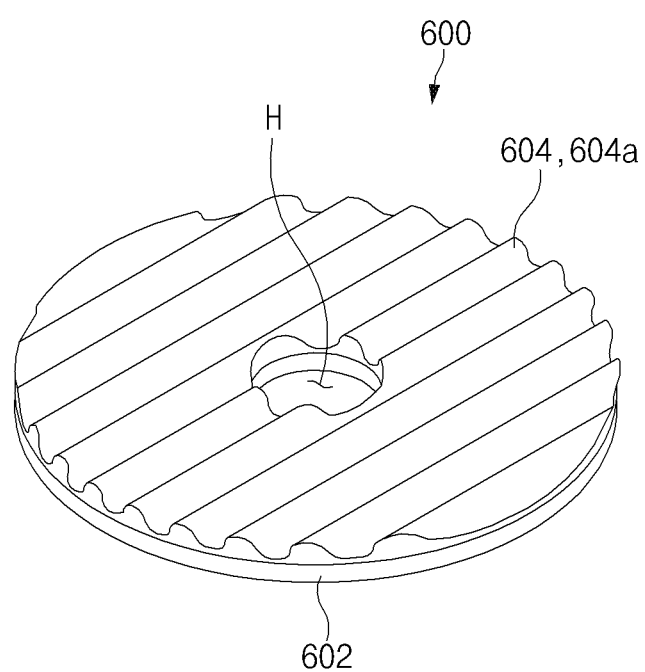
FIG. 2 is a perspective view illustrating an example of a structure of an insulator for a secondary battery according to a first embodiment of the present invention.

FIG. 2 is a perspective view illustrating an example of a structure of an insulator for a secondary battery according to a first embodiment of the present invention.

As illustrated in FIG. 2, an insulator 600 according to the present invention may include a body part 602 defining a body and a buffer part 604 adhering to a top surface of the body part 602. The buffer part 604 may be configured to absorb an impact applied to the electrode assembly when an impact or vibration is applied to the secondary battery or the electrode assembly from the outside. A hole H may be defined in a central portion of the insulator 600.

Also, since the insulator 600 is configured to electrically insulate the electrode assembly 300 from other components, it is necessary that an area of the insulator 600, which faces or directly contacts the electrode assembly 300, is made of a material having electrical insulating properties.

Thus, the buffer part 604 of the insulator 600 may be made of a material having electrical insulation and elasticity so that the electrode assembly is electrically insulated from other components while effectively absorbing the impact applied to the electrode assembly. For example, the buffer part 604 may include or be made of polybutylene terephthalate, polypropylene, perfluoroalkoxy, or a rubber material.

In the insulator 600 according to the present invention, the material of the body part 602 may be different from that of the buffer part 604. The body part 602 may be made of a metal material. For example, the body part 602 may be made of stainless steel or aluminum. When the body part 602 is made of the metal material, since overall rigidity of the insulator 600 increases, even if an external impact is applied, the insulator 600 may normally operate without deforming a shape of the insulator 600. Here, in order to more effectively improve the rigidity of the insulator 600, it is preferable that the body part 602 is formed in a manner in which a flat metal plate having a constant thickness is bonded to one surface of the buffer part 604 rather than that metal powder is applied on the surface of the buffer part 604 at a thin thickness having a thin film level and then sintered.

Figure 3:
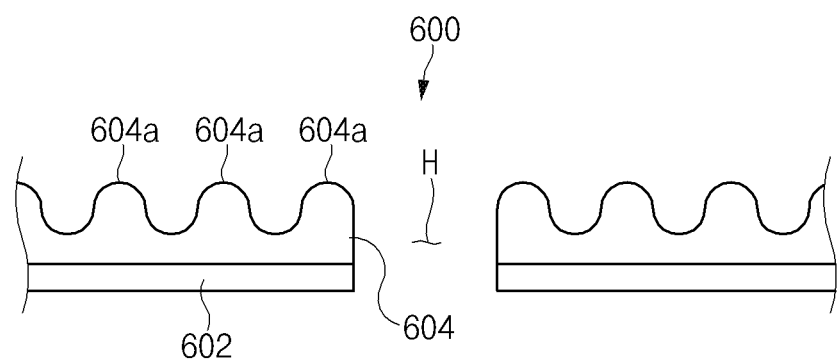
FIG. 3 is an enlarged side cross-sectional view illustrating the example of the structure of the insulator for the secondary battery according to the first embodiment of the present invention.
Figure 4:
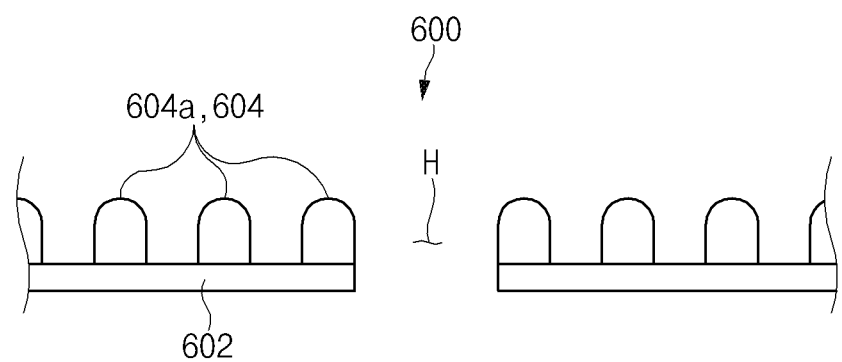
FIG. 4 is an enlarged side cross-sectional view illustrating another example of the structure of the insulator for the secondary battery according to the first embodiment of the present invention.

FIG. 3 is an enlarged side cross-sectional view illustrating the example of the structure of the insulator for the secondary battery according to the first embodiment of the present invention, and FIG. 4 is an enlarged side cross-sectional view illustrating another example of the structure of the insulator for the secondary battery according to the first embodiment of the present invention.

As illustrated in FIGS. 2 and 3, the buffer part 604 of the insulator 600 according to the present invention may include a plurality of protrusions 604a that protrude upward. The plurality of protrusions 604a may be configured to face the electrode assembly 300 (see FIG. 1). When an impact or vibration is applied to the secondary battery or the electrode assembly, the plurality of protrusions 604a of the buffer parts 604 may absorb the impact applied to the electrode assembly to improve durability of the secondary battery.

Here, as illustrated in FIGS. 2 and 3, according to the first embodiment of the present invention, the buffer part 604 of the insulator 600 may have a wave-like wave shape. This may be understood that a horizontal cross-section of each of the plurality of protrusions 604*a* of the buffer part 604 has an elongated rod shape.

Also, as illustrated in FIG. 3, according to an example of the first embodiment of the present invention, the plurality of protrusions 604*a* may be connected to each other by a lower region of the buffer part 604 so that the plurality of protrusions 604*a* are integrally formed.

However, as illustrated in FIG. 4, according to another example of the first embodiment of the present invention, the plurality of protrusions 604*a* may be provided separately from each other. Therefore, as illustrated in FIG. 4, a top surface of the body part 602 may be exposed to the outside between the plurality of protrusions 604*a*.

Figure 5:
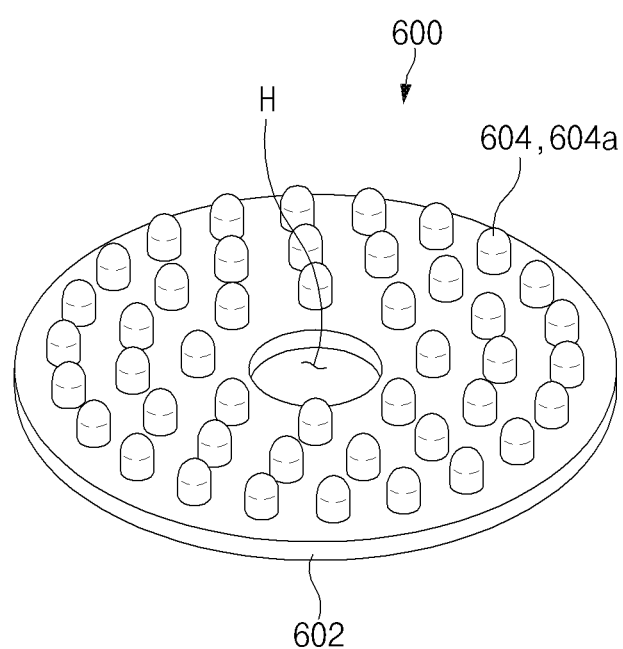
FIG. 5 is a perspective view illustrating an example of a structure of an insulator for a secondary battery according to a second embodiment of the present invention.
Figure 6:
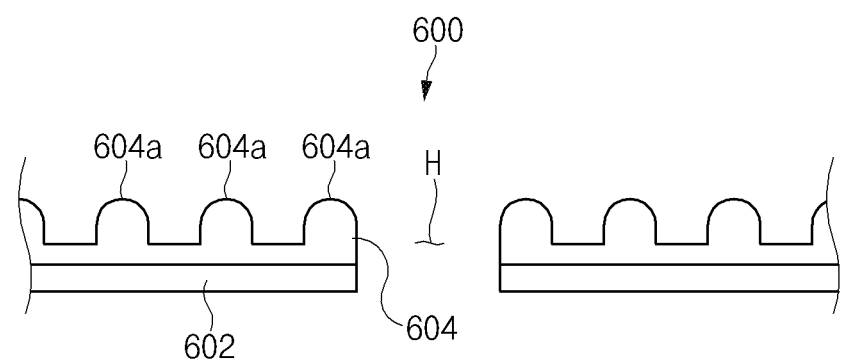
FIG. 6 is an enlarged side cross-sectional view illustrating the example of the structure of the insulator for the secondary battery according to the second embodiment of the present invention.

FIG. 5 is a perspective view illustrating an example of a structure of an insulator for a secondary battery according to a second embodiment of the present invention, and FIG. 6 is an enlarged side cross-sectional view illustrating the example of the structure of the insulator for the secondary battery according to the second embodiment of the present invention. Also, FIG. 7 is an enlarged side cross-sectional view illustrating another example of the structure of the insulator for the secondary battery according to the second embodiment of the present invention.

As illustrated in FIGS. 5 and 6, according to the second embodiment of the present invention, a buffer part 604 of an insulator 600 may have an embossed shape. This may be understood that a horizontal cross-section of each of the plurality of protrusions 640*a* of the buffer part 604 has a circular or oval shape.

Also, as illustrated in FIG. 6, according to an example of the second embodiment of the present invention, a plurality of protrusions 604*a* may be connected to each other by a lower region of the buffer part 604 so that the plurality of protrusions 604*a* are integrally formed.

Figure 7:
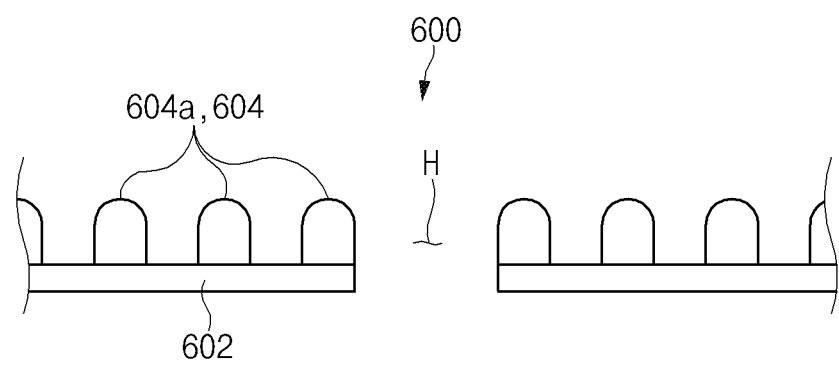
FIG. 7 is an enlarged side cross-sectional view illustrating another example of the structure of the insulator for the secondary battery according to the second embodiment of the present invention.

However, as illustrated in FIG. 7, according to another example of the second embodiment of the present invention, the plurality of protrusions 604*a* may be provided separately from each other. Therefore, as illustrated in FIG. 7, a top surface of the body part 602 may be exposed to the outside between the plurality of protrusions 604*a*.

Figure 8:
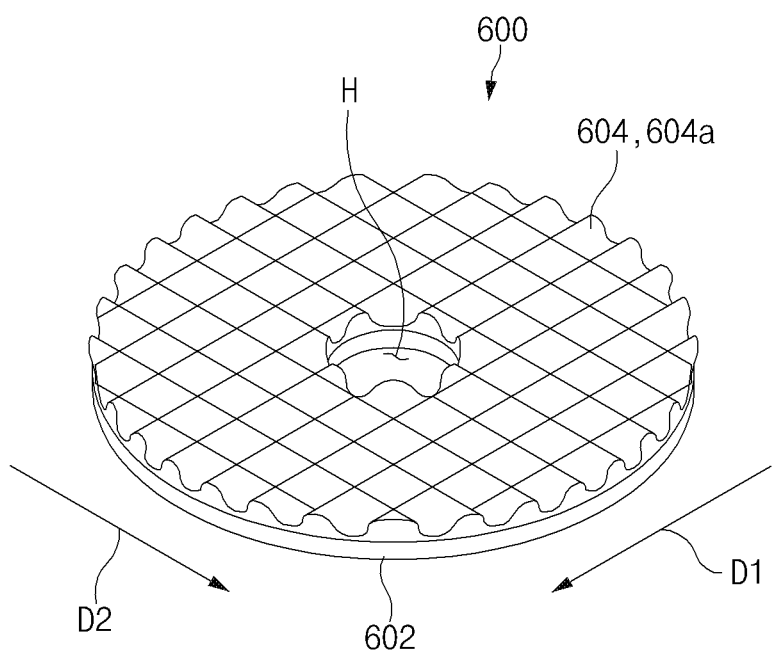
FIG. 8 is a perspective view illustrating an example of a structure of an insulator for a secondary battery according to a third embodiment of the present invention.

FIG. 8 is a perspective view illustrating an example of a structure of an insulator for a secondary battery according to a third embodiment of the present invention.

As illustrated in FIG. 8, according to the third embodiment of the present invention, a buffer part 604 of an insulator 600 may a wave shape in which waves overlaps each other. This may be understood that a horizontal cross-section of a plurality of protrusions 604*a* of the buffer part 604 has an elongated rod shape, and the plurality of protrusions 604*a* include first protrusions in which the rod shape in the horizontal cross-section extends in a first direction D1 and second protrusions in which the rod shape in the horizontal cross-section extends in a second direction D2. Here, as illustrated in FIG. 8, the first direction D1 and the second direction D2 may be perpendicular to each other. That is, the directions in which the rod shapes of the horizontal cross-sections of the first protrusions and the second protrusions extend may be perpendicular to each other.

An upper area of a surface of each of the plurality of protrusions provided on the buffer part 604 according to the present invention may have a curved surface. Therefore, even if the electrode assembly and the buffer part contact each other, the problem in which the electrode assembly is damaged by the plurality of protrusions may be minimized.

While the embodiments of the present invention have been described with reference to the specific embodiments, it will be apparent to those skilled in the art that various changes and modifications may be made without departing from the spirit and scope of the invention as defined in the following claims.

DESCRIPTION OF THE SYMBOLS

10: Secondary battery
100: Battery can
200: Top cap
300: Electrode assembly
310: First electrode tab
320: Second electrode tab
400: Current interrupt member
500: Safety vent
600: Insulator
602: Body part
604: Buffer part
604*a*: Protrusion
610: Upper insulator
620: Lower insulator
H: Hole
D1: First direction
D2: Second direction

The invention claimed is:

1. An insulator for a secondary battery, comprising:
a body part configured to define a body; and
a buffer part on a top surface of the body part,
wherein the buffer part comprises a plurality of protrusions that protrude upward,
wherein the buffer part is made of a material having an elasticity greater than a material of the body part, and
wherein the plurality of protrusions has shape defined by a plurality of first waves extending across a width of the buffer part in a first direction overlapped with a plurality of second waves extending across a width of the buffer part in a second direction that crosses the first direction.

2. The insulator of claim 1, wherein the buffer part comprises one of polybutylene terephthalate, polypropylene, perfluoroalkoxy, and a rubber material.

3. The insulator of claim 1, wherein the plurality of protrusions are connected to each other by a lower region of the buffer part such that the plurality of protrusions are integrally provided.

4. The insulator of claim 1, wherein a top surface of the body part is exposed to the outside between the plurality of protrusions such that the plurality of protrusions are separate from each other.

5. The insulator of claim 1, wherein an upper area of a surface of each of the plurality of protrusions has a curved shape.

6. The insulator of claim 1, wherein the first direction and the second direction are perpendicular to each other.

7. A secondary battery comprising:
a battery can having a structure in which an upper portion is open;
a top cap coupled to the upper portion of the battery can;
an electrode assembly accommodated in the battery can; and
the insulator of claim 1, which is provided to face a top or bottom surface of the electrode assembly.

8. The secondary battery of claim 7, wherein the insulator comprises:

an upper insulator facing the top surface of the electrode assembly; and a lower insulator facing the bottom surface of the electrode assembly, wherein each of the plurality of protrusions of the upper insulator and the plurality of protrusions of the lower insulator is provided to face the electrode assembly.

9. The insulator of claim 1, wherein the buffer part includes an electrically insulating material, and the body part includes a metal material.

* * * * *